US010477212B2

(12) United States Patent
Lu et al.

(10) Patent No.: US 10,477,212 B2
(45) Date of Patent: Nov. 12, 2019

(54) ADAPTIVE CHROMA QUANTIZATION IN VIDEO CODING FOR MULTIPLE COLOR IMAGING FORMATS

(71) Applicant: DOLBY LABORATORIES LICENSING CORPORATION, San Francisco, CA (US)

(72) Inventors: Taoran Lu, Santa Clara, CA (US); Fangjun Pu, Sunnyvale, CA (US); Peng Yin, Ithaca, NY (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 44 days.

(21) Appl. No.: 15/728,939

(22) Filed: Oct. 10, 2017

(65) Prior Publication Data

US 2018/0103253 A1 Apr. 12, 2018

Related U.S. Application Data

(60) Provisional application No. 62/406,483, filed on Oct. 11, 2016.

(51) Int. Cl.
*H04N 19/124* (2014.01)
*H04N 19/186* (2014.01)
*H04N 19/59* (2014.01)
*H04N 19/126* (2014.01)
*H04N 19/157* (2014.01)
*H04N 19/147* (2014.01)

(52) U.S. Cl.
CPC ......... *H04N 19/124* (2014.11); *H04N 19/126* (2014.11); *H04N 19/157* (2014.11); *H04N 19/186* (2014.11); *H04N 19/59* (2014.11); *H04N 19/147* (2014.11)

(58) Field of Classification Search
None
See application file for complete search history.

(56) References Cited

U.S. PATENT DOCUMENTS

| 9,578,341 | B2 * | 2/2017 | Demos | G06T 3/4015 |
|---|---|---|---|---|
| 2016/0366422 | A1 * | 12/2016 | Yin | H04N 19/117 |
| 2017/0085896 | A1 * | 3/2017 | Ramasubramonian | H04N 19/70 |
| 2017/0318293 | A1 * | 11/2017 | Chono | H04N 19/176 |
| 2017/0324958 | A1 * | 11/2017 | Tandon | H04N 19/136 |

OTHER PUBLICATIONS

Pu et al. "AHG13: ICtCp Compression Using HEVC Main 10" (Year: 2016).*
JCTVC-W1005-v4, Joshi, R. et al "High Efficiency Video Coding (HEVC) Screen Content Coding: Draft 6" JCT-VC of ITU-T SG 16, 23rd Meeting, San Diego, USA, Feb. 1-26, 2016.

(Continued)

*Primary Examiner* — Mohammed Jebari

(57) ABSTRACT

Methods to improve the quality of coding high-dynamic range (HDR) signals are presented. Instead of using a single chroma quantization table for all color formats, a video encoder may adaptively use separate tables for each one, and transmit the table's ID to a decoder. Examples for chroma quantization tables for video content encoded in the YCbCr (PQ) and ICtCp (PQ) color formats under a variety of color gamut containers are provided.

7 Claims, 5 Drawing Sheets

(56) References Cited

OTHER PUBLICATIONS

Francois, E. et al "Common Test Conditions for HDR/WCG Video Coding Experiments" Joint Collaborative Team on Video Coding (JCT-VC) of ITU-T SG 16 WP 3 and ISO/IEC JTC 1/SC 29/WG11, 24th Meeting, Geneva, CH, May 26-Jun. 1, 2016, pp. 1-30.
ICtCp white paper: http://www.dolby.com/us/en/technologies/dolby-vision/ICtCp-white-paper.pdf.
Rosewarne, C. et al High Efficiency Video Coding (HEVC) Test Model 16 (HM 16) Improved Encoder Description Update 5, JCT-VC of ITU-T SG 16 WP3, JCTVC-W1002, 23rd Meeting: San Diego, USA, Feb. 19-26, 2016.
ITU Rec.BT 1886 "Reference Electro-Optical Transfer Function for Flat Panel Displays used in HDTV Studio Production" Mar. 2011.
ITU-R BT. 2100 "Image Parameter Values for High Dynamic Range Television for Use in Production and International Programme Exchange" ITU, Jul. 2016.
SMPTE ST 2084:2014 "High Dynamic Range EOTF of Mastering Reference Displays", SMPTE 2014.
ITU-T H.265, "Coding of Moving Video" published in Apr. 2015, in Annex D.2.32.

* cited by examiner

ADAPTIVE CHROMA QUANTIZATION IN VIDEO CODING FOR MULTIPLE COLOR IMAGING FORMATS

CROSS-REFERENCE TO RELATED APPLICATIONS

This application claims the benefit of priority from U.S. Provisional Patent Application No. 62/406,483, filed Oct. 11, 2016, which is hereby incorporated by reference in its entirety.

TECHNOLOGY

The present invention relates generally to images. More particularly, an embodiment of the present invention relates to the efficient coding of video signals represented in multiple color imaging formats.

BACKGROUND

The legacy YCbCr color format is a color-opponent, non-constant luminance format, where signals are interpreted based on color differences in an opposing manner. In YCbCr and similar color-opponent formats (such as YUV) the goal is to separate luma from chroma information for the purposes of chroma subsampling (i.e., 4:2:2 and 4:2:0). Chroma sub-sampling reduces the amount of data required to represent an image without affecting perceptually overall picture quality. Separating color from luma has also been proven to yield coding advantages in a variety of image and video coding standards, such as JPEG, MPEG-1, MPEG-2, AVC, HEVC, and the like.

Recently, High dynamic range (HDR) and wide color gamut (WCG) content have revealed the limitations of existing color encoding methods. Errors that were previously small with standard dynamic range can become magnified. Rec. ITU-R BT.2100-0, *"Image parameter values for high dynamic range television for use in production and international programme exchange,"* ITU, July, 2016, which is incorporated herein by reference in its entirety, provides an alternative method for color difference encoding using a new color imaging format, referred to as ICtCp (or $IC_TC_P$).

Like YCbCr, ICtCp is a color-opponent based encoding scheme intended to separate luma from chroma information. In addition, ICtCp offers constant intensity (CI) representation. The CI neutral (grey) axis is encoded with the SMPTE ST 2084 or Hybrid Log-Gamma (HLG) non-linearity functions to match the human visual system, and to optimize it for high dynamic range signal encoding. Starting from RGB or XYZ representations, color transformation matrices to the ICtCp color format have been optimized for the human visual system perception of HDR and WCG content.

A reference electro-optical transfer function (EOTF) for a given display characterizes the relationship between color values (e.g., luminance) of an input video signal to output screen color values (e.g., screen luminance) produced by the display. For example, ITU Rec. BT. 1886, *"Reference electro-optical transfer function for flat panel displays used in HDTV studio production,"* ITU, March 2011, defines the reference EOTF for flat panel displays based on measured characteristics of the Cathode Ray Tube (CRT). Given a video stream, information about its EOTF or inverse EOTF or OETF is typically embedded in the bit stream as metadata (e.g., video usability information (VUI) metadata).

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014, *"High Dynamic Range EOTF of Mastering Reference Displays,"* SMPTE, 2014, which is incorporated herein by reference, and BT. 2100. Signals encoded using SMPTE ST 2084 may also be referred to as being "PQ-coded," to distinguish them from traditional signals which were "gamma-coded."

Most of the existing video compression standards, such as MPEG-1, MPEG-2, AVC, HEVC, and the like, have been tested, evaluated, and optimized for gamma-coded images in the YCbCr color space using the BT. 709 or BT. 2020 containers; however, experimental results have shown that the ICtCp color format may provide a better representation for high-dynamic range images with 10 or more bits per pixel per color component. In addition, SMPTE ST 2084 and HLG-based encoding provide far more efficient encoding for high dynamic range images than traditional gamma-based encoding. To improve existing coding standards, such as HEVC, as appreciated by the inventors here, improved techniques for the coding of video represented in multiple color imaging formats are needed.

As used herein, the term "color format" relates to a representation of a video signal using at least a color space, such as YCbCr, ICtCp, and the like, and a display-related encoding (also referred to as "transfer characteristics,"), such as linear, gamma, PQ, and the like. The term may also relate to a color gamut representation, such as those defined by BT. 709, BT. 2020, and the like, and a chroma sub-sampling format (e.g., 4:4:4, 4:2:2, or 4:2:0).

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
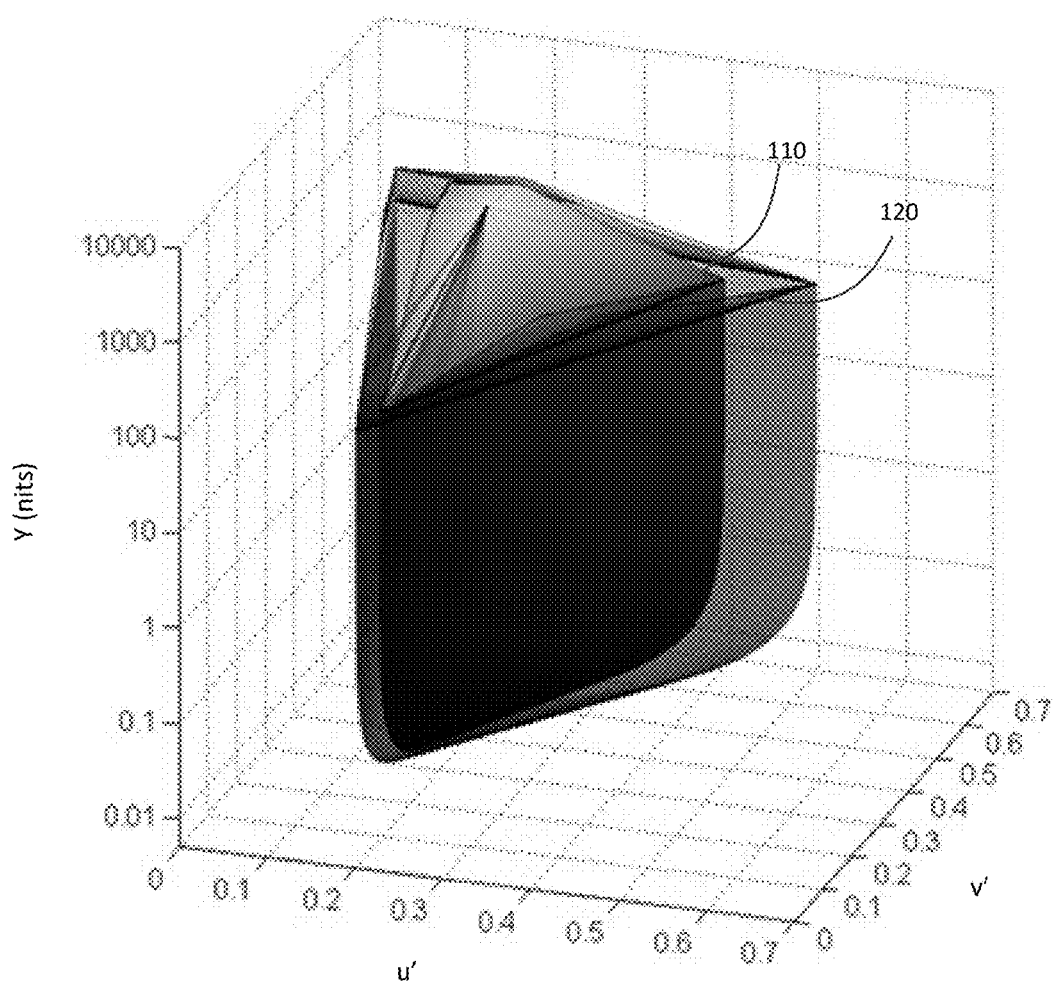
FIG. 1 depicts an example 3D plot of the BT. 709 and BT. 2020 color containers at the same luminance.

Adaptive chroma quantization for multiple color imaging formats is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to methods to adaptively change chroma quantization tables when encoding video sequences by taking into consideration their color format. In a video decoder, in one embodiment, in a method to decode a coded bitstream with a processor, the processor receives an input coded bitstream, it extracts from the input coded bitstream a table identifier for selecting a chroma quantization table among two or more chroma quantization tables, wherein each chroma quantization table is associated with a different color format, and wherein in each chroma quantization table an input index quantization value (qPi) is mapped to an output chroma quantization value ($Qp_C$). The processor selects a chroma quantization table using the table identifier, and then generates a decoded output signal using the selected chroma quantization table and the input coded bitstream.

In a second embodiment, an encoder has access to two or more chroma quantization tables, wherein each chroma quantization table is associated with a different color format, and wherein in each chroma quantization table an input index quantization value (qPi) is mapped to an output chroma quantization value ($Qp_C$). Given an input signal to be encoded, a processor in the encoder identifies the input color format and selects the chroma quantization table best associated with the input color format. The processor encodes the input video signal using the selected chroma quantization table and embeds the table's ID into the coded bitstream.

In a third embodiment, in an encoder, in a method to generate color-format-specific chroma quantization tables, for a set of input luminance quantization parameters ($Qp_Y$), the processor generates corresponding QP offset values based on the color format and one or more color gamut containers. The processor generates one or more sets of chroma quantization parameters based on the QP offset values. Finally, a color-format-specific chroma quantization table is generated based on a function (e.g., averaging) of the computed one or more sets of the chroma quantization parameters for one or more chroma components and the one or more gamut containers.

Video Coding Color Formats

Annex E of the HEVC (also known as H.265) video coding standard, which is incorporated herein by reference in its entirety, lists a variety of color imaging formats supported by the HEVC color description syntax. Table 1 shows the most commonly used standard dynamic range (SDR) and high dynamic range (HDR) formats and their corresponding video usability information (VUI) messaging parameters.

TABLE 1

Commonly used video formats and corresponding VUI variables in HEVC

| Format | colour_primaries (for container) | transfer_characteristics | matrix_coeffs |
|---|---|---|---|
| SDR Y'Cb'Cr' | BT. 709 (1) | gamma (1) | YCbCr 709 (1) |
| HDR Y'Cb'Cr' PQ | BT. 2020/2100 (9) | (PQ) SMPTE ST 2084 (16) | Y'Cb'Cr' 2020/2100 (9) |
| HDR Y'Cb'Cr' ICtCp | BT. 2020/2100 (9) | (PQ) SMPTE ST 2084 (16) | ICtCp (14) |
| HDR Y'Cb'Cr' HLG | BT. 2020/2100 (9) | HLG (18) | Y'Cb'Cr' (9) |

In Table 1, "gamma" refers to traditional gamma-based encoding, for example, according to the Rec. ITU-R BT 709-5 or Rec. BT. 1361 conventional color gamut systems. The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An example of a PQ mapping function is described in the SMPTE ST 2084:2014 specification, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidentally may have a very rough similarity to the way the human visual system responds, a PQ curve imitates the true visual response of the human visual system using a relatively simple functional model.

Comparison of SDR Y'Cb'Cr' gamma in BT. 709 and HDR Y'Cb'Cr' PQ in BT. 2020/2100 container color formats In BT. 709, the R'G'B' to Y'Cb'Cr' color conversion matrix is given by $$\begin{aligned} \text{a. } & Y' = 0.2126 * R' + 0.7152 * G' + 0.0722 * B' \\ \text{b. } & Cb' = \frac{B' - Y'}{1.8556} \\ \text{c. } & Cr' = \frac{R' - Y'}{1.5748} \end{aligned} \quad (1)$$

In BT. 2020/2100, the corresponding color conversion matrix is given by a. $Y' = 0.2627 * R' + 0.6780 * G' + 0.0593 * B'$ (2)

b. $Cb' = \dfrac{B' - Y'}{1.8814}$ c. $Cr' = \dfrac{R' - Y'}{1.4746}$

Comparing equations (1) and (2), the scaling factors for chroma appear to be very close; however, if one takes into consideration the actual color volume space (at the same bit depth), there might be a significant difference between the chroma components for the two formats. FIG. 1 shows a 3D representation of the color volumes of BT. 709 (110) and BT. 2020/2100 (120) at the same luminance dynamic range. As depicted in FIG. 1, BT. 2020 can hold much larger color volume than BT. 709. From a color gamut point of view, the BT. 2020 color space covers about 75.8% of the CIE 1931 color volume, while the BT. 709 color space covers about 35.9%.

In most applications, SDR content uses gamma encoding while HDR content uses PQ (SMPTE ST 2084) encoding. When using the default (e.g., HEVC) coding settings for both SDR Y'Cb'Cr' gamma and HDR Y'Cb'Cr' PQ, HDR compression results show a lot of color artifacts. In practice, even if one uses the BT. 2020/2100 container, due to limitations of the display technology, when content is color graded, the content may only cover the BT. 709 or the P3 color gamut, and its maximum luminance value might not exceed 4,000 nits.

Comparison of HDR Y'Cb'Cr' PQ and HDR ICtCp PQ in a BT. 2020/2100 container color formats ICtCp (also referred to as $IC_TC_P$) is a new color-difference representation defined in Rec. ITU-R BT. 2100. According to the ICtCp derivation process presented in "ICtCp White paper," Dolby Laboratories, version 7.2, in order to fit chroma between −0.5 and 0.5, a scaling factor of 1.4 is applied to the Ct component and a scaling factor of 1.0 is applied to the Cp component. Studies show that CtCp generally contains more energy (in terms of variance) than CbCr. This may be explained due to the different scaling factors. To fit chroma signals into the [−0.5 0.5] range, for Cb and Cr, the scaling factors are both less than 1, which means that both Cb and Cr signals are "reduced" or scaled down. When using Ct and Cp, the scaling factors are 1.4 and 1 respectively, which means that the Ct signal is expanded or scaled up. The underlying reason is that the ICtCp format is very close to Constant Luminance, but non-constant-luminance (NCL) Y'Cb'Cr' is not.

As used herein, the terms "isoluminance" or "constant luminance" refer to a measure of how well luminance (say, I of ICtCp or Y of YCbCr) correspond to true luminance. Indirectly, the terms measure how well a color space separates luma from chroma. In other words, CbCr chroma signals contain a lot of luminance information, which has to be down-scaled in order to fit to the signal range. In compression, experiments have shown that using Y'Cb'Cr' PQ settings to code ICtCp PQ content is rather inefficient in terms of compression efficiency (e.g., in terms of the number of bits used per chroma pixel).

Hybrid Log-Gamma (HLG), also defined in BT. 2100, is an alternative to PQ-coding and claims to offer a greater degree of compatibility with legacy displays by more closely matching the gamma curve. In that sense, in compression, when HLG coding is used, it may be preferable to continue using existing SDR settings, even for HDR-coded images. Taking all these into consideration, a new methodology for adaptive selection of quantization tables in video coding, based on the input color format is proposed.

In Section 8.6 of the H.265 (HEVC) specification, given a luma quantization value (denoted as QpY or $Qp_Y$) and certain quantization offset parameters, the chroma quantization parameter $Qp_C$ (also to be denoted as QPc) may be computed as a mapping of qPi values to $Qp_C$ values, where qPi is a function of Qp, given by:

$$qPiCb = Clip3(-QpBdOffsetC, 57, QpY + \text{pps\_cb\_qp\_offset} + \text{slice\_cb\_qp\_offset} + CuQpOffsetCb) \quad (3)$$

$$qPiCr = Clip3(-QpBdOffsetC, 57, QpY + \text{pps\_cr\_qp\_offset} + \text{slice\_cr\_qp\_offset} + CuQpOffsetCr),$$

where $$Clip3(x, y, z) = \begin{cases} x; & z < x \\ y; & z > y \\ z; & \text{otherwise} \end{cases}.$$

For YCbCr 4:2:0, the variables $qP_{Cb}$ and $qP_{Cr}$ are set equal to the value of $Qp_C$ as specified in Table 2 (Table 8-10 in H.265) based on setting the index qPi equal to qPiCb and qPiCr, respectively.

TABLE 2

Specification of $Qp_C$ as a function of qPi for 4:2:0

| | qPi | | | | | | | | | | | | | | |
|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| $Qp_C$ =qPi | 29 | 30 | 31 | 32 | 33 | 33 | 34 | 34 | 35 | 35 | 36 | 36 | 37 | 37 | =qPi-6 |

In the MPEG SDR Common Test Conditions (CTC), the offset parameters of equation (3), pps_cb_qp_offset, pps_cr_qp_offset, slice_cb_qp_offset, slice_cr_qp_offset, CuQpOffsetCb, and CuQpOffsetCr are all set to 0. In testing both SDR and HDR content under common test conditions, severe chroma artifacts were observed for HDR/WCG content, while no such artifacts were observed for SDR content. As a result, in contribution "*Common Test Conditions for HDR/WCG video coding experiments*," by E. Francois, et al., JCTVC-X1010, JCT-VC, ITU-T SG 16 WP3 and ISO/IEC JTC 1/SC 29/WG 11, Geneva, CH, May 2016, which is incorporated herein by reference, a model is used that assigns Cb and Cr QP offsets based on the luma QP and a factor based on the capture color space and the representation color space. The motivation is to perform none or minor adjustment for small QP, when compression quality is good (visually lossless or near lossless), and to do stronger adjustments for large QP, when color artifacts are prominent. For the YCbCr (PQ) format, this model is expressed as $$CbQpOffset=Clip3(-12,0,\text{round}(c\_cb*(k*QP+l))),$$

$$CrQpOffset=Clip3(-12,0,\text{round}(c\_cr*(k*QP+l))), \quad (4)$$

where
- $c\_cb=1$, if the capture color space is the same as the representation color space;
- $c\_cb=1.04$ if the capture color space is P3D65 and the representation color space is BT. 2020; and
- $c\_cb=1.14$ if the capture color space is BT. 709 and the representation space is BT. 2020.

Furthermore,
- $c\_cr=1$ if the capture color space is the same as the representation color space;
- $c\_cr=1.39$ if the capture color space is P3D65 and the representation color space is BT. 2020; and
- $c\_cr=1.78$ if the capture color space is BT. 709 and the representation space is BT 2020.

Finally, $k=-0.46$ and $l=9.26$. From equation (4), the final offset value should be less than or equal to 0.

For ICtCp (PQ), to reduce chroma bits, equation (4) may be further modified by adding a positive offset as depicted in.

$$CtQpOffset=Clip3(-12,12,Clip3(-12,0,\text{round}(c\_ct*(k*QP+l))))+CtOffset,$$

$$CpQpOffset=Clip3(-12,12,Clip3(-12,0,\text{round}(c\_cp*(k*QP+l))))+CpOffset, \quad (5)$$

where
- $c\_ct=1$ if the capture color space is the same as the representation color space;
- $c\_ct=0.5$ if the capture color space is P3D65 and the representation color space is BT. 2020; and
- $c\_ct=0.9$ if the capture color space is 709 and the representation space is BT. 2020.

Furthermore,
- $c\_cp=1$ if the capture color space is the same as the representation color space;
- $c\_cp=0.9$ if the capture color space is P3D65 and the representation color space is BT. 2020;
- $c\_cp=1.6$ if the capture color space is BT. 709 and the representation space is BT. 2020;
- $k=-0.46$ and $l=10$;
- CtOffset=8 and CpOffset=7 if the capture color space is P3D65 and the representation color space is BT. 2020; and
- CtOffset=6 and CpOffset=6 if the capture color space is BT. 709 or BT.2020 and the representation color space is BT. 2020.

The final offset value should be less than or equal to 12 and larger than or equal to −12. For notation purposes, to follow the notation in the HEVC specification, in the rest of this discussion, the chroma components will always be denoted as Cb and Cr or as C0 and C1 even though they may represent chroma in a different color format (e.g., CtCp). For example, for ICtCp, Ct will be equivalent to Cb (or C0) and Cp will be equivalent to Cr (or C1).

All of the above chroma-related encoder optimizations point out that for HDR content (especially Y'Cb'Cr' PQ and ICtCp PQ), the default HEVC $Qp_C$ values are not sufficient to compress both SDR and HDR content. By only using just one default $Qp_C$ table, which is biased toward SDR signals, compression performance of HDR signals is severely limited.

In this invention, a proposal is made to utilize multiple default $Qp_C$ tables to address the differences between the chroma characteristics of SDR and HDR signals. In one embodiment, three default $Qp_C$ tables are proposed for the following three signal formats:
- SDR Y'Cb'Cr' gamma in BT. 709 container;
- HDR Y'Cb'Cr' PQ in BT. 2020/2100 container; and
- HDR ICtCp PQ in BT. 2020/2100 container.

In other embodiments, for each of the above signal formats, multiple tables can be proposed based on true source content volume, for example, one for BT. 709, one for P3, and/or another for BT. 2020. Furthermore, distinct tables may be used for each of the chroma components. In another embodiment, two default $Qp_C$ tables are proposed, one for SDR content and one for HDR content. Since there are two main coding HDR signal formats, one may use a single HDR $Qp_C$ table for one format and enable the other one by some simple design adjustments in the encoder.

Adaptive $Qp_C$ selection using multiple chroma quantization tables

In an embodiment, an encoder may use one of N (e.g., N=3 or 4) default $Qp_C$ tables to encode incoming video, depending on the input color format. For example, without limitation, a coding system could support three default tables for
- SDR Y'Cb'Cr' gamma in BT. 709 container;
- HDR Y'Cb'Cr' PQ in BT. 2020/2100 container; and
- HDR ICtCp PQ in BT. 2020/2100 container.

In an embodiment, the default tables may be generated as follows: a) For SDR (YCbCr) signals, use the existing default HEVC $Qp_C$ tables. b) For HDR signals, new color-format specific tables may be developed as follows.

Consider, without limitation, as an example, the ICtCp (PQ) color format represented in the BT. 2020/2100 container.

Using equation (5), compute CbQPOffset and CrQPOffset for multiple capture color volume spaces (e.g., BT. 709, P3, BT. 2020, and the like) across the range of allowable input $Qp_Y$ values.

Compute the corresponding quantization parameter $QP_{Cb}$ and $QP_{Cr}$

For example, for "Cb," the CbQpOffset value is added to $Qp_Y$ to get qPiCb; then one may use Table 2 to identify the corresponding $Qp_C$;

Map the input $Qp_Y$ values to the generated $Qp_C$ values. As an example, let $Qp_Y=42$, let the computed CxQpOffset=−6, then qPiCx=42−6=36, and from Table 2, the corresponding $Qp_C=34$. Note that for $QP_Y=42$, the default (YCbCr (gamma)) HEVC $Qp_C$ value is 37.

Generate the final default $Qp_C$ table as a function of the previously computed values. For example, $Qp_C=f$(QPcb_709, QPcr_709, QPcb_p3, QPcr_p3, QPcb_2020, QPcr_2020), where f(.) can be one of the following: select: one out of many (e.g., P3), the average, a weighted average, the minimum, or the maximum of all $Qp_C$ values.

Figure 2A:
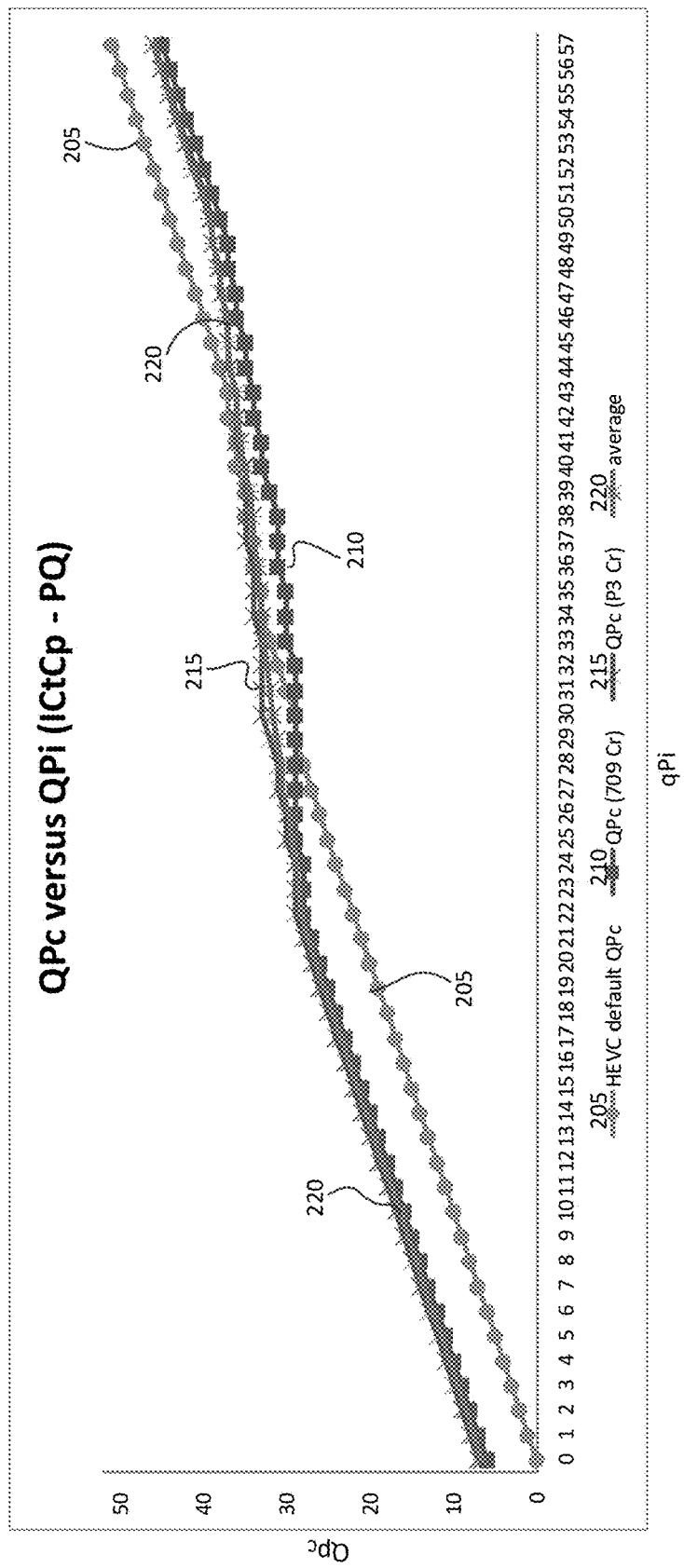
FIG. 2A depicts an example plot of $Qp_C$ versus qPi values for ICtCp (PQ) as computed according to an embodiment of this invention.
Figure 2B:
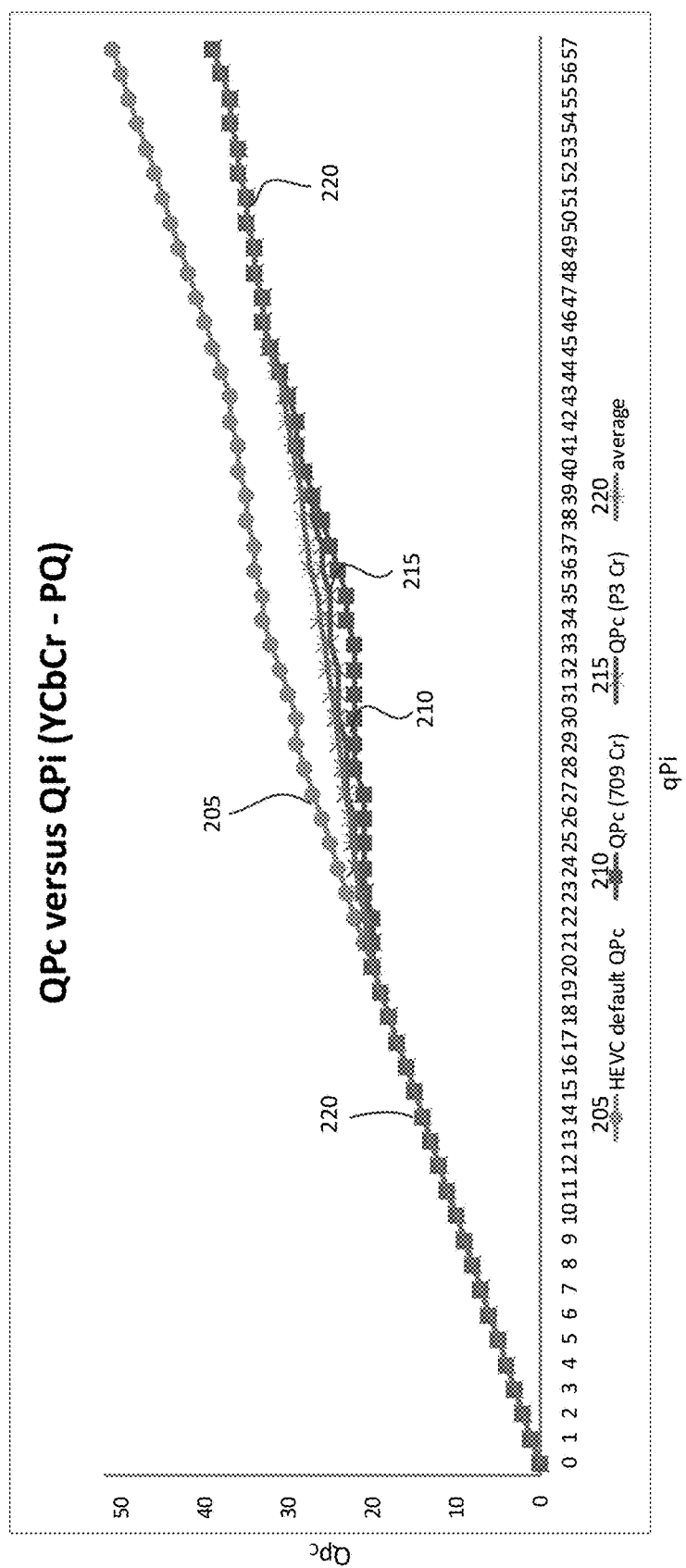
FIG. 2B depicts an example plot of $Qp_C$ versus qPi values for YCbCr (PQ) as computed according to an embodiment of this invention.

Table 3 lists an example of default $Qp_C$ values for the ICtCp (PQ) color space using the "averaging" function. Similarly, Table 4 lists an example of default $Qp_C$ values for Y'Cb'Cr' (PQ). FIG. 2A and FIG. 2B show plots of the relationship between qPi and the derived $Qp_C$ tables for ICtCp (PQ) and YCbCr (PQ) cases respectively. Table 5 provides an example of a final table that includes all three cases of interest: SDR Y'Cb'Cr' gamma (QPc[0]), HDR Y'Cb'Cr' PQ (QPc[1]), and HDR ICtCp PQ (QPc[2]).

From FIG. 2A, for the ICtCp (PQ) color format, one may observe that for up to about qPi=27, the default HEVC $Qp_C$ values (205) are smaller than the computed ICtCp (PQ) $Qp_C$ values (210, 215, 220). Similarly, after about qPi=42, the default HEVC $Qp_C$ values (205) are bigger than the computed ICtCp (PQ) $Qp_C$ values.

From FIG. 2B, for the YCbCr (PQ) color format, up to about qPi=21 the default HEVC $Qp_C$ values (205) are about the same as the computed YCbCr (PQ) $Qp_C$ values (210, 215, 220), but after qPi=21, the default HEVC $Qp_C$ values (205) are bigger than the computed YCbCr (PQ) $Qp_C$ values.

To control which table is used in coding, a new variable may be added in the high level syntax of the encoder format. For example, without limitation, Table 6 shows an example using HEVC's sequence parameter set (SPS). A new syntax element, chroma_qp_table_idc, is added to indicate which $Qp_C$ table is to be selected. In a decoder, the decoder reads the chroma_qp_table_idc value and selects the appropriate $Qp_C$ table. In some embodiments, as an alternative, the high level syntax (e.g., SPS in HEVC) may add syntax to explicitly specify the $Qp_C$ table as part of the bitstream.

For Table 6, when using three $Qp_C$ tables, the following description may be added to the HEVC specification: chroma_qp_table_idc is an indication of an index to the array of $Qp_C$ as a function of qPi for ChromaArrayType equal to 1. The value of chroma_qp_table_idc shall be in the range of 0 to 2, inclusive.

Figure 3:
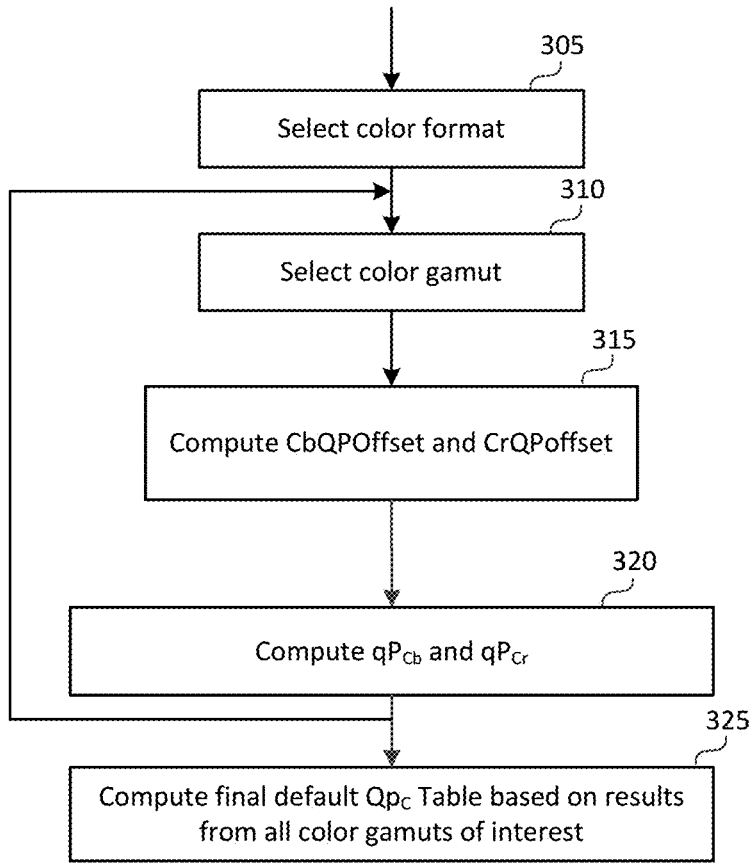
FIG. 3 depicts an example process for computing custom default $Qp_C$ tables for a specific color format according to an embodiment of this invention.

FIG. 3 depicts an example process for computing custom $Qp_C$ quantization tables according to an embodiment. For a given color format (step 305) (e.g., YCbCr (PQ) or ICtCp (PQ)) and a color gamut (step 310) (e.g., BT. 709 or BT. 2020), appropriate CxQpOffset (x=0, 1) values are computed for the two color components (say CbCr or CtCp) (e.g., using equations (4) or (5)) (step 315). Then, for a given set of $Qp_Y$ values, appropriate $Qp_C$ values are computed (step 320) (e.g., using equation (3) and Table 2). The process is repeated for multiple color gamuts of interest. Finally, (in step 325), the results are combined (e.g., via averaging or some other function) to generate the default table for the given color format.

Figure 4:
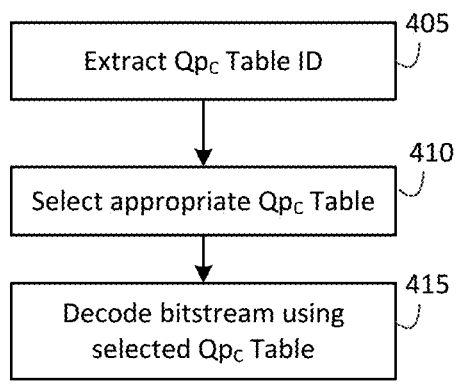
FIG. 4 depicts an example process for decoding a video bitstream using multiple $Qp_C$ tables according to embodiments of this invention.

FIG. 4 depicts an example process for decoding a coded bitstream that was coded using multiple chroma quantization tables. First, (step 405), a table identification number is extracted (e.g., via the chroma_qp_table_idc value). Then, the appropriate table is selected (step 410), and values in the selected table are used to decode the encoded bitstream (step 415).

TABLE 3

Example of default $Qp_C$ Table for the ICtCp (PQ) color format

| | qPi | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| QPc (709 Cb) | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 28 | 29 | 29 | 29 | 30 | 30 |
| QPc (709 Cr) | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 28 | 29 | 29 | 29 | 29 | 29 |
| QPc (P3 Cb) | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 29 | 30 | 30 | 31 | 32 | 33 | 33 |
| QPc (P3 Cr) | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 29 | 29 | 30 | 30 | 31 | 31 |
| QPc (2020 Cb) | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 28 | 29 | 29 | 29 | 30 | 30 |
| QPc (2020 Cr) | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 28 | 29 | 29 | 29 | 30 | 30 |
| average | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 28 | 29 | 29 | 30 | 30 | 31 | 31 |

| | qPi | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 |
| QPc (709 Cb) | 31 | 32 | 32 | 33 | 33 | 33 | 34 | 34 | 34 | 34 | 35 | 35 | 35 | 36 | 36 | 36 | 36 | 37 | 37 | 37 | 38 | 38 | 39 | 40 | 41 | 42 | 43 | 44 | 45 |
| QPc (709 Cr) | 29 | 29 | 29 | 29 | 30 | 30 | 30 | 31 | 31 | 31 | 32 | 33 | 33 | 34 | 34 | 35 | 35 | 36 | 36 | 37 | 37 | 38 | 39 | 40 | 41 | 42 | 43 | 44 | 45 |
| QPc (P3 Cb) | 33 | 34 | 34 | 35 | 35 | 35 | 36 | 36 | 36 | 37 | 37 | 38 | 39 | 39 | 40 | 41 | 42 | 42 | 43 | 44 | 45 | 45 | 46 | 47 | 48 | 49 | 49 | 50 | 51 |
| QPc (P3 Cr) | 32 | 33 | 33 | 33 | 33 | 34 | 34 | 34 | 35 | 35 | 35 | 35 | 36 | 36 | 36 | 37 | 37 | 37 | 38 | 38 | 39 | 39 | 40 | 41 | 42 | 43 | 44 | 45 | 46 |
| QPc (2020 Cb) | 31 | 31 | 32 | 32 | 33 | 33 | 33 | 33 | 34 | 34 | 34 | 35 | 35 | 35 | 35 | 36 | 36 | 36 | 37 | 37 | 38 | 39 | 40 | 41 | 42 | 43 | 44 | 45 |
| QPc (2020 Cr) | 31 | 31 | 32 | 32 | 33 | 33 | 33 | 33 | 34 | 34 | 34 | 35 | 35 | 35 | 35 | 36 | 36 | 36 | 36 | 37 | 37 | 38 | 39 | 40 | 41 | 42 | 43 | 44 | 45 |
| average | 31 | 32 | 32 | 32 | 33 | 33 | 33 | 34 | 34 | 34 | 35 | 35 | 36 | 36 | 36 | 37 | 37 | 37 | 38 | 38 | 39 | 39 | 40 | 41 | 42 | 43 | 44 | 45 | 46 |

TABLE 4

Example of default $Qp_C$ Table for the Y'Cb'Cr' (PQ) color format

| | qPi | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| QPc (709 Cb) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 21 | 21 | 22 | 22 | 23 | 23 | 24 |
| QPc (709 Cr) | 0 | 1 | 2 | 3 | 4 | 5 | 6 | 7 | 8 | 9 | 10 | 11 | 12 | 13 | 14 | 15 | 16 | 17 | 18 | 19 | 20 | 20 | 21 | 21 | 21 | 21 | 21 | 22 |

TABLE 4-continued

Example of default $Qp_C$ Table for the Y'Cb'Cr' (PQ) color format

| | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| QPc (P3 Cb) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 21 | 22 | 22 | 23 | 23 | 24 | 24 |
| QPc (P3 Cr) | 0 | 1 | 2 | 3 | 4 | 5 | 6 | 7 | 8 | 9 | 10 | 11 | 12 | 13 | 14 | 15 | 16 | 17 | 18 | 19 | 20 | 20 | 21 | 21 | 22 | 22 | 22 | 23 | 23 |
| QPc (2020 Cb) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 21 | 22 | 22 | 23 | 23 | 24 | 24 |
| QPc (2020 Cr) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 21 | 22 | 22 | 23 | 23 | 24 | 24 |
| average | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 21 | 22 | 22 | 22 | 23 | 23 | 24 |

| | qPi | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 |
| QPc (709 Cb) | 24 | 25 | 25 | 26 | 26 | 27 | 27 | 28 | 28 | 29 | 29 | 29 | 29 | 30 | 30 | 31 | 32 | 33 | 33 | 34 | 34 | 35 | 35 | 36 | 36 | 37 | 37 | 38 | 39 |
| QPc (709 Cr) | 22 | 22 | 22 | 22 | 22 | 23 | 23 | 24 | 25 | 26 | 27 | 28 | 29 | 29 | 30 | 31 | 32 | 33 | 33 | 34 | 34 | 35 | 35 | 36 | 36 | 37 | 37 | 38 | 39 |
| QPc (P3 Cb) | 25 | 25 | 26 | 26 | 27 | 27 | 28 | 28 | 29 | 29 | 29 | 29 | 30 | 31 | 31 | 32 | 32 | 33 | 33 | 34 | 34 | 35 | 35 | 36 | 36 | 37 | 37 | 38 | 39 |
| QPc (P3 Cr) | 23 | 24 | 24 | 24 | 25 | 25 | 25 | 26 | 26 | 27 | 27 | 28 | 29 | 29 | 30 | 31 | 32 | 33 | 33 | 34 | 34 | 35 | 35 | 36 | 36 | 37 | 37 | 38 | 39 |
| QPc (2020 Cb) | 25 | 25 | 26 | 27 | 27 | 28 | 28 | 29 | 29 | 29 | 29 | 30 | 30 | 31 | 31 | 32 | 33 | 33 | 33 | 34 | 34 | 35 | 35 | 36 | 36 | 37 | 37 | 38 | 39 |
| QPc (2020 Cr) | 25 | 25 | 26 | 27 | 27 | 28 | 28 | 29 | 29 | 29 | 29 | 30 | 30 | 31 | 31 | 32 | 33 | 33 | 33 | 34 | 34 | 35 | 35 | 36 | 36 | 37 | 37 | 38 | 39 |
| average | 24 | 24 | 25 | 25 | 26 | 26 | 27 | 27 | 28 | 28 | 28 | 29 | 30 | 30 | 31 | 32 | 32 | 33 | 33 | 34 | 34 | 35 | 35 | 36 | 36 | 37 | 37 | 38 | 39 |

TABLE 5

Example of Qpc as a function of qPi for three color formats

| | qPi | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| QPc [0] | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| QPc [1] | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 21 | 22 | 22 | 22 | 23 | 23 | 24 |
| QPc [2] | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 28 | 29 | 29 | 30 | 30 | 31 | 31 |

| | qPi | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 |
| QPc [0] | 29 | 29 | 30 | 31 | 32 | 33 | 33 | 34 | 34 | 35 | 35 | 36 | 36 | 37 | 37 | 38 | 39 | 40 | 41 | 42 | 43 | 44 | 45 | 46 | 47 | 48 | 49 | 50 | 51 |
| QPc [1] | 24 | 24 | 25 | 25 | 26 | 26 | 27 | 27 | 28 | 28 | 28 | 29 | 30 | 30 | 31 | 32 | 32 | 33 | 33 | 34 | 34 | 35 | 35 | 36 | 36 | 37 | 37 | 38 | 39 |
| QPc [2] | 31 | 32 | 32 | 32 | 33 | 33 | 33 | 34 | 34 | 34 | 35 | 35 | 36 | 36 | 36 | 37 | 37 | 37 | 38 | 38 | 39 | 39 | 40 | 41 | 42 | 43 | 44 | 45 | 46 |

TABLE 6

Example of signaling a chroma quantization table ID in a coded bitsream`seq_parameter_set_rbsp( ) {

| | Descriptor |
|---|---|
| sps_video_parameter_set_id | u(4) |
| sps_max_sub_layers_minus1 | u(3) |
| sps_temporal_id_nesting_flag | u(1) |
| profile_tier_level( 1, sps_max_sub_layers_minus1 ) | |
| sps_seq_parameter_set_id | ue(v) |
| chroma_format_idc | ue(v) |
| if( chroma_format_idc = = 3 ) | |
|   separate_colour_plane_flag | u(1) |
| pic_width_in_luma_samples | ue(v) |
| pic_height_in_luma_samples | ue(v) |
| conformance_window_flag | u(1) |
| if( conformance_window_flag ) { | |
|   conf_win_left_offset | ue(v) |
|   conf_win_right_offset | ue(v) |
|   conf_win_top_offset | ue(v) |
|   conf_win_bottom_offset | ue(v) |

TABLE 6-continued

Example of signaling a chroma quantization table ID in a coded bitsream`seq_parameter_set_rbsp( ) {

| | Descriptor |
|---|---|
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for( i = ( sps_sub_layer_ordering_info_present_flag | |
| ? 0 : sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1 [ i ] | ue(v) |
| } | |
| log2_min_luma_coding_block_size_minus3 | ue(v) |
| log2_diff_max_min_luma_coding_block_size | ue(v) |
| log2_min_luma_transform_block_size_minus2 | ue(v) |
| log2_diff_max_min_luma_transform_block_size | ue(v) |
| max_transform_hierarchy_depth_inter | ue(v) |
| max_transform_hierarchy_depth_intra | ue(v) |
| scaling_list_enabled_flag | u(1) |
| chroma_qp_table_idc  /* New variable for Qpc table index */ | ue(v) |
| if( scaling_list_enabled_flag ) { | |
|     sps_scaling_list_data_present_flag | u(1) |
|     if( sps_scaling_list_data_present_flag ) | |
|         scaling_list_data( ) | |
| } | |
| amp_enabled_flag | u(1) |
| sample_adaptive_offset_enabled_flag | u(1) |
| pcm_enabled_flag | u(1) |
| if( pcm_enabled_flag ) { | |
|     pcm_sample_bit_depth_luma_minus1 | u(4) |
|     pcm_sample_bit_depth_chroma_minus1 | u(4) |
|     log2_min_pcm_luma_coding_block_size_minus3 | ue(v) |
|     log2_diff_max_min_pcm_luma_coding_block_size | ue(v) |
|     pcm_loop_filter_disabled_flag | u(1) |
| } | |
| num_short_term_ref_pic_sets | ue(v) |
| for( i = 0; i < num_short_term_ref_pic_sets; i++) | |
|     st_ref_pic_set( i ) | |
| long_term_ref_pics_present_flag | u(1) |
| if( long_term_ref_pics_present_flag ) { | |
|     num_long_term_ref_pics_sps | ue(v) |
|     for( i = 0; i < num_long_term_ref_pics_sps; i++ ) { | |
|         lt_ref_pic_poc_lsb_sps[ i ] | u(v) |
|         used_by_curr_pic_lt_sps_flag[ i ] | u(1) |
|     } | |
| } | |
| sps_temporal_mvp_enabled_flag | u(1) |
| strong_intra_smoothing_enabled_flag | u(1) |
| vui_parameters_present_flag | u(1) |
| if( vui_parameters_present_flag ) | |
|     vui_parameters( ) | |
| sps_extension_present_flag | u(1) |
| if( sps_extension_present_flag ) { | |
|     sps_range_extension_flag | u(1) |
|     sps_multilayer_extension_flag | u(1) |
|     sps_3d_extension_flag | u(1) |
|     sps_scc_extension_flag | u(1) |
|     sps_extension_4bits | u(4) |
| } | |
| if( sps_range_extension_flag ) | |
|     sps_range_extension( ) | |
| if( sps_multilayer_extension_flag ) | |
|     sps_multilayer_extension( ) /* specified in Annex F */ | |
| if( sps_3d_extension_flag ) | |
|     sps_3d_extension( ) /* specified in Annex I*/ | |
| if( sps_scc_extension_flag ) | |
|     sps_scc_extension( ) | |
| if( sps_extension_4bits ) | |
|     while( more_rbsp_data( ) ) | |
|         sps_extension_data_flag | u(1) |
| rbsp_trailing_bits( ) | |
| } | |

In another embodiment, to simplify the design, only two default $Qp_C$ tables may be used, for example, the existing default table for Y'Cb'Cr' (gamma) and a new HDR table for Y'Cb'Cr' PQ in BT. 2020/2100 container. For HDR video signals in ICtCp (PQ) in BT. 2020/2100, one may reuse the same table as in Y'Cb'Cr' PQ, but with the following possible adjustments.

In one embodiment, on the encoder, one may set the chroma QPOffset for "Cb" and "Cr" (in reality, Ct and Cp) to constant positive values (e.g., CbQpOffset=6).

Alternatively, on the encoder, one may set the chroma QPOffset for "Cb" and "Cr" to 0; however, during the rate-distortion (RD) optimization one should modify the equation to generate a $J_{mode}$ decision, from the default $$J_{mode}=(SSE_{luma}+w_{chroma}*SSE_{chroma})+\lambda_{mode}*B_{mode}, \qquad (6)$$

to $$J_{mode}=(SSE_{luma}+0.25*w_{chroma}*SSE_{chroma})+\lambda_{mode}*B_{mode}, \qquad (7)$$

$$\lambda_{chroma}=4*\lambda_{mode}/w_{chroma}$$

where $J_{mode}$ denotes the RD cost for mode decisions, SSE denotes the sum of square errors (for luma or chroma), $B_{mode}$ specifies the bit cost to be considered for the mode decision and depends on each decision case, $\lambda_{mode}$ is a lagrangian used in cost computation and is defined as $$\lambda_{mode} = a*2^{\left(\frac{QP-12}{3}\right)},$$

where α is a variable that depends on coding parameters. $\lambda_{chroma}$ is a lagrangian used for chroma-specific decisions. It is typically computed as $$\lambda_{chroma}=\lambda_{mode}/w_{chroma},$$

where $$w_{chroma} = 2^{\left(\frac{QP-QPchroma}{3}\right)}.$$

Thus, from equations (6) and (7), when computing $J_{mode}$, in an embodiment, it is recommended to replace $w_{chroma}$ with $w_{chroma}/4$. Additional details for the parameters in equation (6) may be found in Section 6.3.4 (RD Cost Function) of "JCTVC-W1002, *"High Efficiency Video Coding (HEVC) Test Model 16 (HM 16), Improved Encoder Description Update 5,"* by C. Rosewarne et al., JCT-VC, ITU-T SG 16 WP3 and ISO/IEC JTC 1/SC 29/WG 11, San Diego, USA, February 2016, which is incorporated herein by reference.

Figure 5:
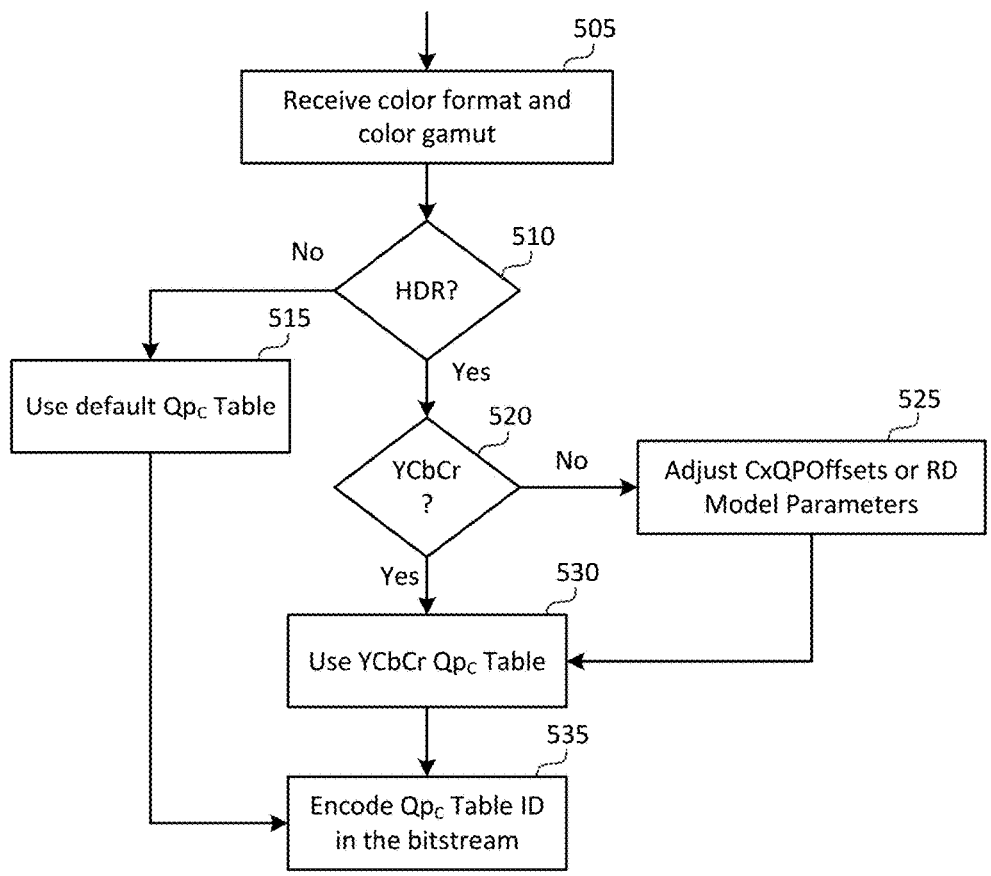
FIG. 5 depicts an example process for encoding a video bitstream using multiple $Qp_C$ tables according to embodiments of this invention.

FIG. 5 depicts an example process on the encoder to adaptively change the chroma quantization tables based on the input color formats. For example, given an input (505) at a specific color format and color gamut, the encoder may decide (step 510) whether to use the default HEVC $Qp_C$ table (e.g., for SDR content using YCbCr (gamma)) (step 515) or use a new $Qp_C$ table (e.g., for HDR content). For HDR content, (step 520) if a table is available for the specific format (say, YCbCr (PQ)) then that table is used for encoding (step (530)) and the table's ID is embedded in the bitstream (e.g., via the chroma_qp_table_idc value) (step 535). Otherwise, (e.g., the input is in ICtCp (PQ) and there is no such table), in step 525, the encoder may decide to use one of the existing HDR tables and adjust the encoding process as described earlier (e.g., fix the CxQpOffset values and/or apply equation (7)).

EXAMPLE COMPUTER SYSTEM IMPLEMENTATION

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to adaptive chroma quantization for multiple video coding color formats, such as those described herein. The computer and/or IC may compute any of a variety of parameters or values that relate to adaptive chroma quantization for multiple video coding color formats processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive chroma quantization for multiple video coding color formats as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient adaptive chroma quantization for multiple video coding color formats are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. In a video decoder, a method to decode a coded bitstream with a processor, the method comprising:
    receiving an input coded bitstream;
    extracting from the input coded bitstream a table identifier for selecting a chroma quantization table among two or more chroma quantization tables, wherein the two or more chroma quantization tables comprise a first table for the YCbCr (gamma) color format and a second table for the YCbCr (PQ) color format, wherein each chroma quantization table is associated with a different color format, and wherein in each chroma quantization table an input index quantization value (qPi) is mapped to an output chroma quantization value ($Qp_C$), wherein for input qPi values larger than a first value, the corresponding output $Qp_C$ values for the first table are higher than the corresponding output $Qp_C$ values for the second table;
    selecting a chroma quantization table using the table identifier; and
    generating a decoded output signal using the selected chroma quantization table and the input coded bitstream.

2. The method of claim 1, wherein the first value is between 19 and 24.

3. The method of claim 1, wherein the two or more quantization tables comprise a first table for the YCbCr (gamma) color format and a second table for the ICtCp (PQ) color format.

4. The method of claim 3, wherein for input qPi values smaller than a second value, the corresponding output $Qp_C$ values for the first table are smaller than the corresponding output $Qp_C$ values for the second table.

5. The method of claim 1, wherein the second value is between 24 and 30.

6. An apparatus comprising a processor and configured to decode a coded bitstream, wherein decoding comprises:
    receiving an input coded bitstream;
    extracting from the input coded bitstream a table identifier for selecting a chroma quantization table among two or more chroma quantization tables, wherein the two or more chroma quantization tables comprise a first table for the YCbCr (gamma) color format and a second table for the YCbCr (PQ) color format, wherein each chroma quantization table is associated with a different color format, and wherein in each chroma quantization table an input index quantization value (qPi) is mapped to an output chroma quantization value ($Qp_C$), wherein for input qPi values larger than a first value, the corresponding output $Qp_C$ values for the first table are higher than the corresponding output $Qp_C$ values for the second table;

selecting a chroma quantization table using the table identifier; and generating a decoded output signal using the selected chroma quantization table and the input coded bitstream.

7. A non-transitory computer-readable storage medium having stored thereon computer-executable instructions for decoding a coded bitstream with one or more processors, wherein decoding comprises:

receiving an input coded bitstream;

extracting from the input coded bitstream a table identifier for selecting a chroma quantization table among two or more chroma quantization tables, wherein the two or more chroma quantization tables comprise a first table for the YCbCr (gamma) color format and a second table for the YCbCr (PQ) color format, wherein each chroma quantization table is associated with a different color format, and wherein in each chroma quantization table an input index quantization value (qPi) is mapped to an output chroma quantization value ($Qp_C$), wherein for input qPi values larger than a first value, the corresponding output $Qp_C$ values for the first table are higher than the corresponding output $Qp_C$ values for the second table;

selecting a chroma quantization table using the table identifier; and generating a decoded output signal using the selected chroma quantization table and the input coded bitstream.

* * * * *